US007177794B2

(12) United States Patent
Mani et al.

(10) Patent No.: US 7,177,794 B2
(45) Date of Patent: Feb. 13, 2007

(54) SYSTEM AND METHOD FOR WRITING INDIAN LANGUAGES USING ENGLISH ALPHABET

(76) Inventors: Babu V Mani, 2325 Terping Pl., Plano, TX (US) 75025; Anees B Mani, 2325 Terping Pl., Plano, TX (US) 75025

( * ) Notice: Subject to any disclaimer, the term of this patent is extended or adjusted under 35 U.S.C. 154(b) by 713 days.

(21) Appl. No.: 10/121,820

(22) Filed: Apr. 12, 2002

(65) Prior Publication Data

US 2003/0195741 A1 Oct. 16, 2003

(51) Int. Cl.
*G06F 17/28* (2006.01)
*G06F 17/27* (2006.01)
*G06F 17/21* (2006.01)

(52) U.S. Cl. ...................... 704/8; 704/2; 704/9; 704/10

(58) Field of Classification Search .................... 704/3, 704/9, 10, 8, 2

See application file for complete search history.

(56) References Cited

U.S. PATENT DOCUMENTS 5,640,587 A * 6/1997 Davis et al. ................ 715/535
6,813,607 B1 * 11/2004 Faruquie et al. ............ 704/276
2001/0052900 A1 * 12/2001 Lee ............................ 345/467
2003/0074185 A1 * 4/2003 Kang ............................ 704/2

FOREIGN PATENT DOCUMENTS

GB 2227110 A * 7/1990

OTHER PUBLICATIONS

Sinha et al. Anglabharti: A Multilingual Machine Aided Translation Project on Translation from English to Indian Languages, Systems, Man and Cybernetics, Oct. 22-25, 1995, pp. 1609-1614.*
R.M.K. Sinha, Dealing With Unknowns In Machine Translation, Systems, Man, and Cybernetics, 2001, pp. 940-944.*

* cited by examiner

*Primary Examiner*—Richemond Dorvil
*Assistant Examiner*—Thomas E. Shortledge

(57) ABSTRACT

A system and method for writing Indian languages using the English writing scheme is provided that includes specifying a script using the English alphabet to represent the various characters and character combinations in various Indian languages. The specified script follows the writing conventions of English. This script is based on how the Indian languages are spoken and rules are specified to facilitate mapping the sounds represented in English characters to the native language in its written form. This common method is intended for writing Hindi and related languages, such as Sanskrit, Marathi, and Gujarathi, and Bengali and somewhat distant, but closely related Dravidian languages, such as Malayalam, Tamil, Kannada, and Telegu.

11 Claims, 4 Drawing Sheets

VOWELS

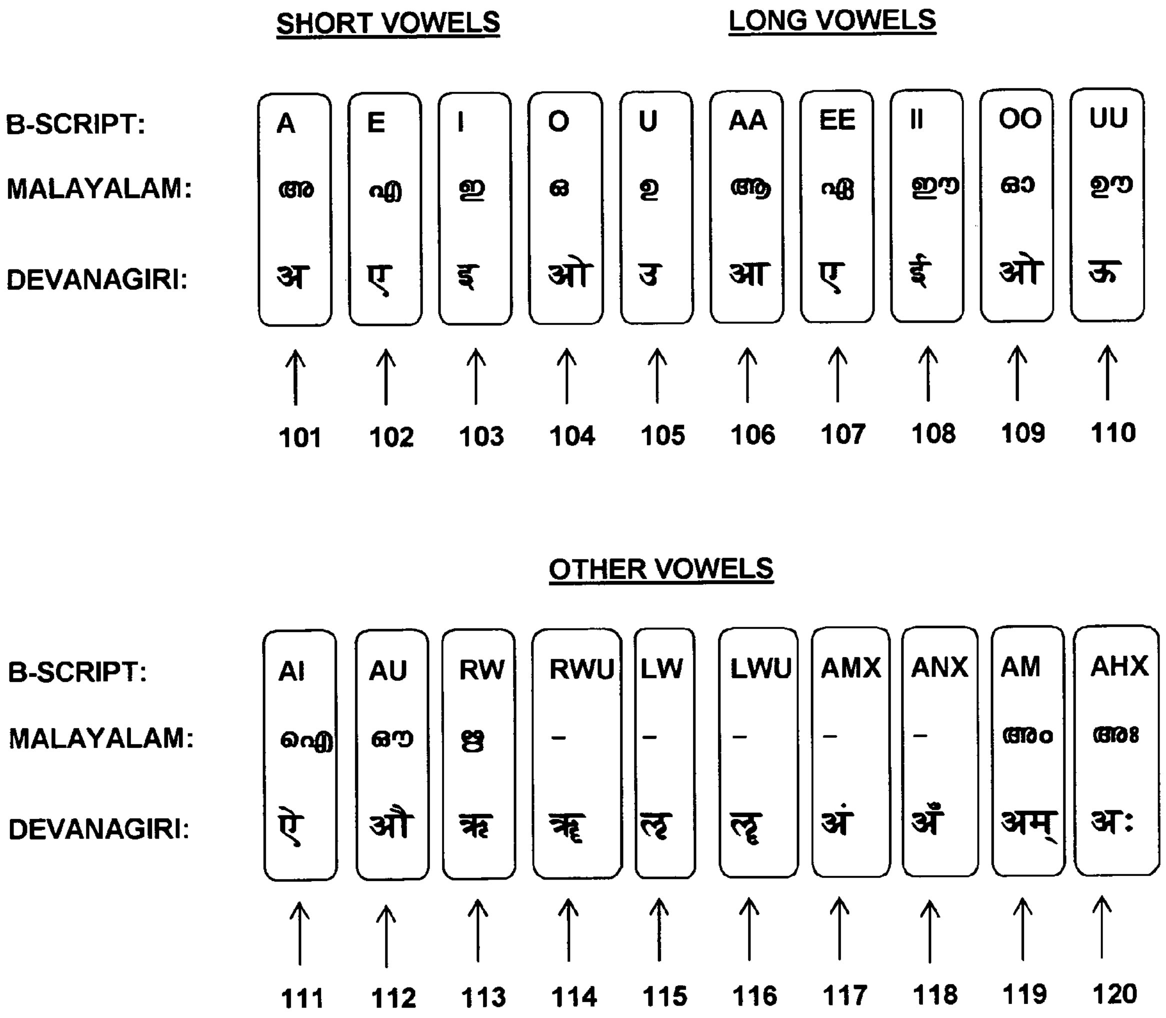
FIGURE 1: VOWELS
SHORT VOWELS LONG VOWELS
| | | | | | | | | | | |
|---|---|---|---|---|---|---|---|---|---|---|
| B-SCRIPT: | A | E | I | O | U | AA | EE | II | OO | UU |
| MALAYALAM: | അ | എ | ഇ | ഒ | ഉ | ആ | ഏ | ഈ | ഓ | ഊ |
| DEVANAGIRI: | अ | ए | इ | ओ | उ | आ | ए | ई | ओ | ऊ |
| | ↑ | ↑ | ↑ | ↑ | ↑ | ↑ | ↑ | ↑ | ↑ | ↑ |
| | 101 | 102 | 103 | 104 | 105 | 106 | 107 | 108 | 109 | 110 |
OTHER VOWELS
| | | | | | | | | | | |
|---|---|---|---|---|---|---|---|---|---|---|
| B-SCRIPT: | AI | AU | RW | RWU | LW | LWU | AMX | ANX | AM | AHX |
| MALAYALAM: | ഐ | ഔ | ഋ | - | - | - | - | - | അം | അഃ |
| DEVANAGIRI: | ऐ | औ | ऋ | ॠ | ऌ | ॡ | अं | अँ | अम् | अः |
| | ↑ | ↑ | ↑ | ↑ | ↑ | ↑ | ↑ | ↑ | ↑ | ↑ |
| | 111 | 112 | 113 | 114 | 115 | 116 | 117 | 118 | 119 | 120 |

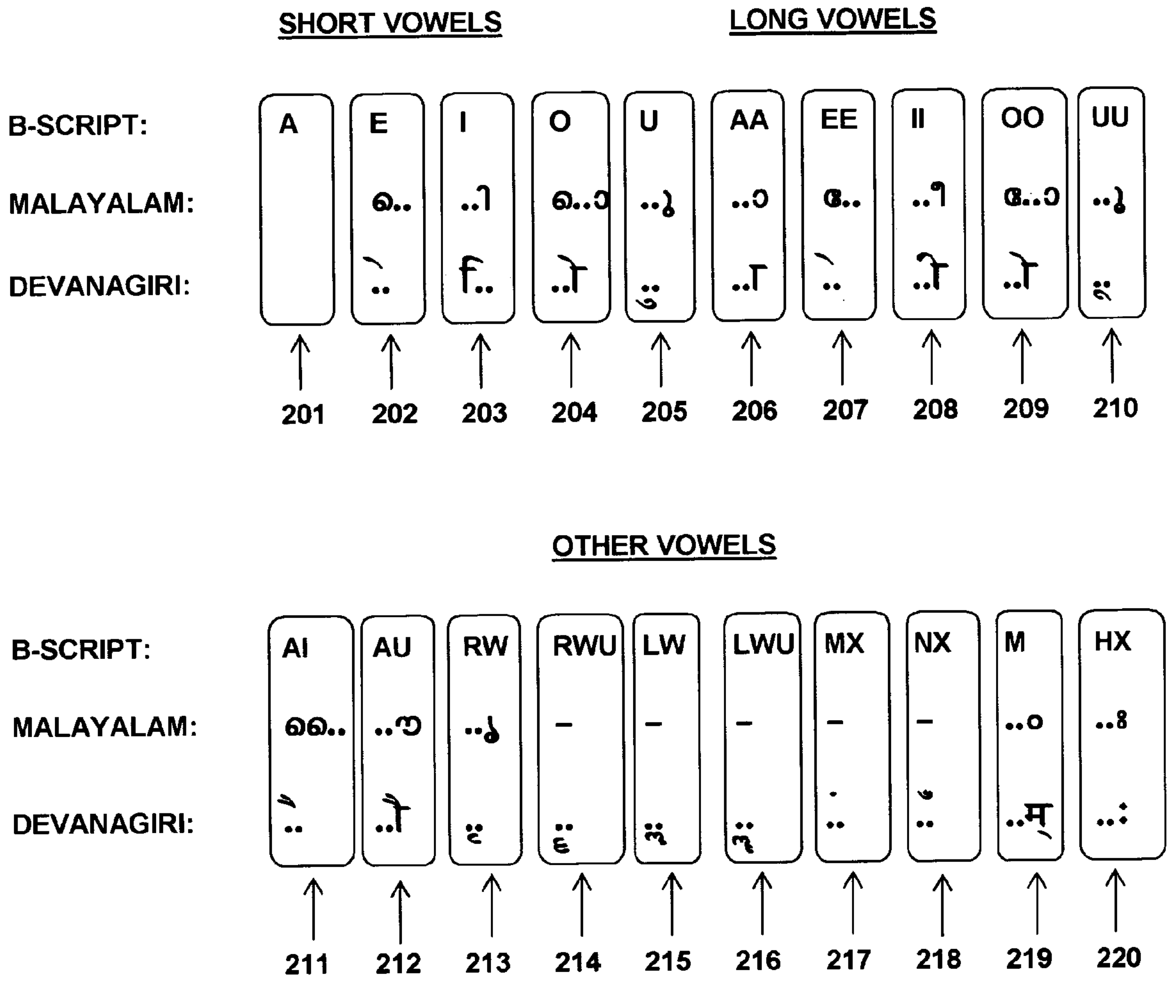
FIGURE 2: VOWEL SYMBOLS
SHORT VOWELS
| | | | | | |
|---|---|---|---|---|---|
| B-SCRIPT: | A | E | I | O | U |
| MALAYALAM: | | �െ.. | ..ി | ഒ...ാ | ..ു |
| DEVANAGIRI: | | ॅ.. | ि.. | ..ॊ | ..ु |
| | ↑ 201 | ↑ 202 | ↑ 203 | ↑ 204 | ↑ 205 |
LONG VOWELS
| | | | | | |
|---|---|---|---|---|---|
| B-SCRIPT: | AA | EE | II | OO | UU |
| MALAYALAM: | ..ാ | േ.. | ..ീ | ോ...ാ | ..ൂ |
| DEVANAGIRI: | ..ा | ै.. | ..ी | ..ो | ू |
| | ↑ 206 | ↑ 207 | ↑ 208 | ↑ 209 | ↑ 210 |
OTHER VOWELS
| | | | | | | | | | | |
|---|---|---|---|---|---|---|---|---|---|---|
| B-SCRIPT: | AI | AU | RW | RWU | LW | LWU | MX | NX | M | HX |
| MALAYALAM: | ൈ.. | ..ൌ | ..ൃ | – | – | – | – | – | ..ം | ..ഃ |
| DEVANAGIRI: | ै.. | ..ौ | ृ.. | ॄ.. | ऌ.. | ॣ.. | .. | ..ँ | ..म् | ..ः |
| | ↑ 211 | ↑ 212 | ↑ 213 | ↑ 214 | ↑ 215 | ↑ 216 | ↑ 217 | ↑ 218 | ↑ 219 | ↑ 220 |

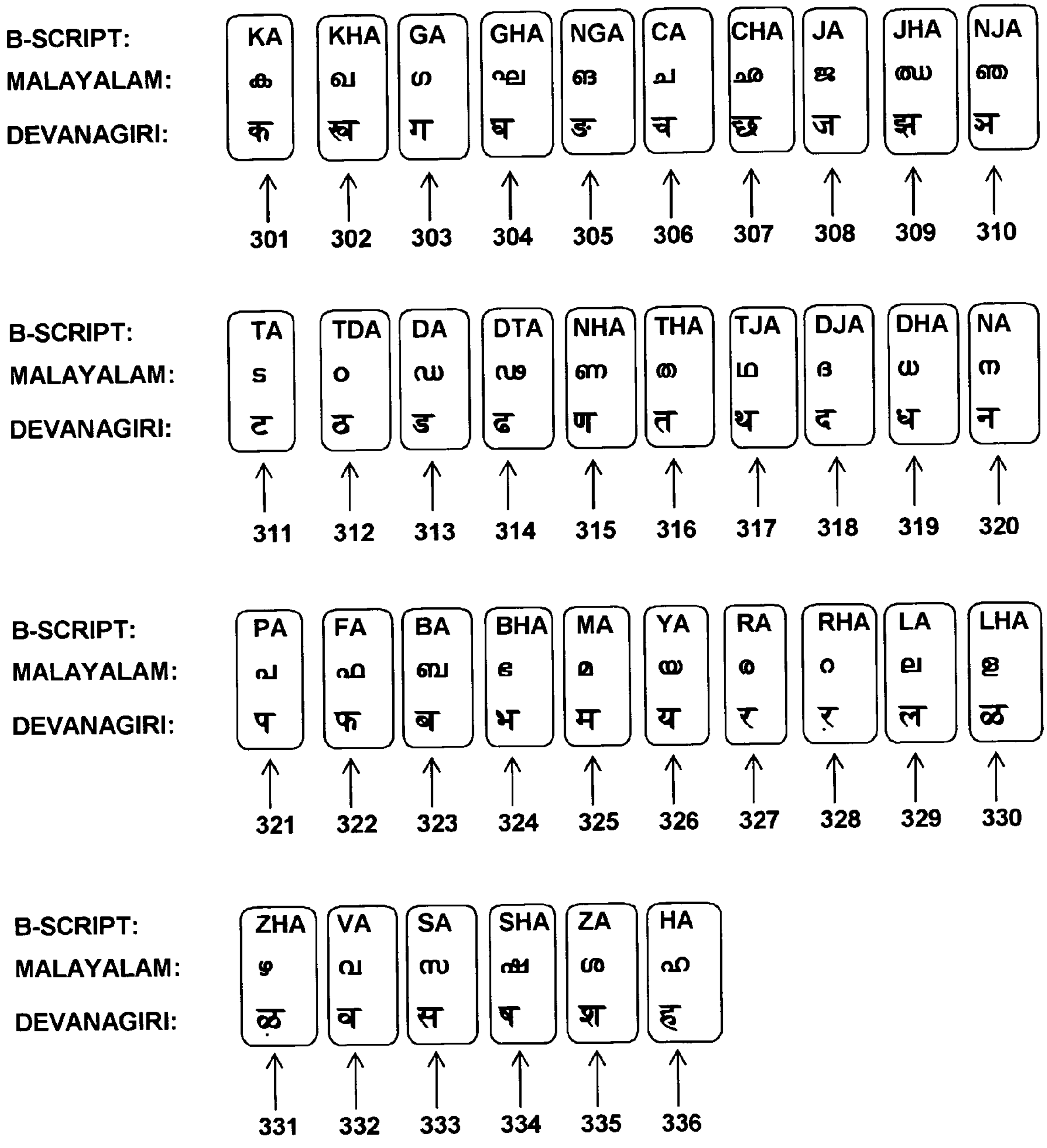

FIGURE 3: CONSONANTS

| B-SCRIPT: | KA | KHA | GA | GHA | NGA | CA | CHA | JA | JHA | NJA |
|---|---|---|---|---|---|---|---|---|---|---|
| MALAYALAM: | ക | ഖ | ഗ | ഘ | ങ | ച | ഛ | ജ | ഝ | ഞ |
| DEVANAGIRI: | क | ख | ग | घ | ङ | च | छ | ज | झ | ञ |
| | ↑ 301 | ↑ 302 | ↑ 303 | ↑ 304 | ↑ 305 | ↑ 306 | ↑ 307 | ↑ 308 | ↑ 309 | ↑ 310 |

| B-SCRIPT: | TA | TDA | DA | DTA | NHA | THA | TJA | DJA | DHA | NA |
|---|---|---|---|---|---|---|---|---|---|---|
| MALAYALAM: | ട | ഠ | ഡ | ഢ | ണ | ത | ഥ | ദ | ധ | ന |
| DEVANAGIRI: | ट | ठ | ड | ढ | ण | त | थ | द | ध | न |
| | ↑ 311 | ↑ 312 | ↑ 313 | ↑ 314 | ↑ 315 | ↑ 316 | ↑ 317 | ↑ 318 | ↑ 319 | ↑ 320 |

| B-SCRIPT: | PA | FA | BA | BHA | MA | YA | RA | RHA | LA | LHA |
|---|---|---|---|---|---|---|---|---|---|---|
| MALAYALAM: | പ | ഫ | ബ | ഭ | മ | യ | ര | റ | ല | ള |
| DEVANAGIRI: | प | फ | ब | भ | म | य | र | ऱ | ल | ळ |
| | ↑ 321 | ↑ 322 | ↑ 323 | ↑ 324 | ↑ 325 | ↑ 326 | ↑ 327 | ↑ 328 | ↑ 329 | ↑ 330 |

| B-SCRIPT: | ZHA | VA | SA | SHA | ZA | HA |
|---|---|---|---|---|---|---|
| MALAYALAM: | ഴ | വ | സ | ശ | ഷ | ഹ |
| DEVANAGIRI: | ऴ | व | स | ष | श | ह |
| | ↑ 331 | ↑ 332 | ↑ 333 | ↑ 334 | ↑ 335 | ↑ 336 |

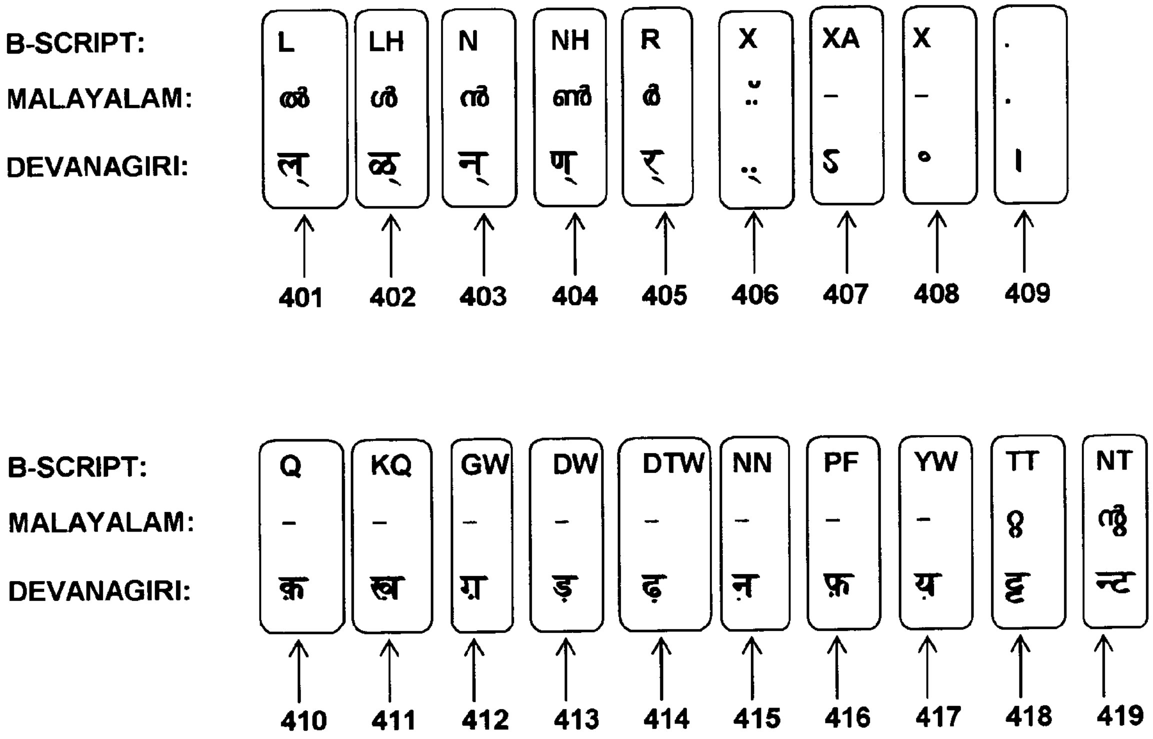
FIGURE 4: OTHER SYMBOLS AND CHARACTERS
| B-SCRIPT: | L | LH | N | NH | R | X | XA | X | . |
|---|---|---|---|---|---|---|---|---|---|
| MALAYALAM: | ൽ | ൾ | ൻ | ൺ | ർ | ൔ | – | – | . |
| DEVANAGIRI: | ल् | ळ् | न् | ण् | र् | ः | ऽ | ० | । |
| | ↑ | ↑ | ↑ | ↑ | ↑ | ↑ | ↑ | ↑ | ↑ |
| | 401 | 402 | 403 | 404 | 405 | 406 | 407 | 408 | 409 |
| B-SCRIPT: | Q | KQ | GW | DW | DTW | NN | PF | YW | TT | NT |
|---|---|---|---|---|---|---|---|---|---|---|
| MALAYALAM: | – | – | – | – | – | – | – | – | ഠ | ൻറ |
| DEVANAGIRI: | क़ | ख़ | ग़ | ड़ | ढ़ | ऩ | फ़ | य़ | ड़ | न्ट |
| | ↑ | ↑ | ↑ | ↑ | ↑ | ↑ | ↑ | ↑ | ↑ | ↑ |
| | 410 | 411 | 412 | 413 | 414 | 415 | 416 | 417 | 418 | 419 |

SYSTEM AND METHOD FOR WRITING INDIAN LANGUAGES USING ENGLISH ALPHABET

The present invention relates generally to a transliteration system, and more particularly, to a system and method for representing Indian languages, such as Malayalam, Hindi, and Tamil, using the English alphabet.

BACKGROUND OF THE INVENTION

Indian languages in general are written the way they are pronounced. Many of the vowels and consonants found in the Indian languages are the same. Some have a few more and some have fewer characters than others do. There are different character sets, and the writing schemes have different sets of rules. In the written form, each language has hundreds of character combinations. It is extremely difficult to represent them in a standard keyboard. There have been some attempts to reduce the number of characters in each language to help with electronic print media. For instance, the print media has stopped using many of the former consonant-vowel combinations, where each such combination represented a separate character, and started using independent vowel symbols along with the consonants. The same way, many combined consonants also gave way to consonants written as separate characters, thus reducing the total number of characters required in a language. With such recent innovations, the Indian writing scheme can be described in terms of stand-alone vowels, vowel symbols used along with consonants, the consonants, and a few special characters, and the rules governing the character combinations.

Even with the reduction in the number of characters supported in each language, it was not easy to represent the total number of characters required in an Indian language in a standard keyboard. For instance, in Malayalam, which is a South Indian language, there are fifteen stand-alone vowels and fourteen vowel symbols, and thirty-six consonants and a number of other special characters. Indian languages are case insensitive languages, i.e., the concept of lower case and upper case characters does not exist in Indian languages. Even by distinguishing the upper case letter keys from the lower case letter keys, the standard English keyboard only supports fifty-two letters in total. As such, people began to use other character keys to represent the additional letters.

Another attempt to manage the issue of number of keys available in a standard keyboard vs. the number of keys required by an Indian language is via software programs, which designate English character combinations to represent each required Indian language character. This represents an improvement to the prior art of character mapping using special key combinations. However, there is no standard for this mapping between the English character representation and the Indian language characters. Different schemes exist even within the same Indian language. Each software vendor elects his own scheme to do the mapping for the particular language or languages supported by the vendor's software.

The influence of English on Indian languages is indisputable. So many English words have become common words among the Indian population and speakers of different Indian languages use these words not recognizing those words as having come from the English language. When English words are written using an Indian language writing scheme, those words become difficult to understand and are mostly pronounced wrong. As such, writing English words in English, along with the Indian language is a welcome change to maintain the accuracy of the English words.

When fonts were created for Indian languages, those who created those fonts did not follow any standard to make them compatible with each other. In English, a character has the same value irrespective of the font being used. For Indian languages, specialized programs are required to map between different fonts. At present, there is some attempt to make them uniform and inter-changeable.

When typing Indian languages, one is forced to use the shift keys on a constant basis. This is true whether the scheme is keyboard mapping or specialized software using English characters to enter Indian language characters. With keyboard mapping, shifting of keys between upper case and lower case and the use of specialized keys is inevitable because each symbol must be assigned to a specific key or key combination. This problem could have been avoided by using specialized software. Many software manufacturers improved on the prior art by assigning the same key combinations for vowels, whether they appear in the stand-alone format or are vowel symbols, which are combined with consonants. However, they failed to remove the distinction between upper case and lower case letters. Character key combinations are difficult to remember if it involves case sensitivity, where one is forced to remember that a lower case character represents one Indian character, but the same character in the upper case will represent another character. In other words, one has to have a good image of a character and its association with the corresponding case-sensitive English representation, rather than to the sound of the character, to make effective use of these software programs.

Reading becomes very difficult when upper case characters are used in the middle of a word. For example, "engLisH". In English, choice of an upper case or a lower case character is made based on readability and its visual effect. The meaning or the sound of a character does not change with the use of upper case or lower case characters. Shifting keys in the middle of a word or a syllable is a tedious task. It takes more time and can cause typing errors. Constantly shifting between upper case and lower case letters is quite boring and the resulting output also creates a poor visual image.

In addition to the mixed use of upper case and lower case characters, many transliteration programs introduced the use of special characters, such as *, @, #, ^, and ~, including punctuation marks to spell some characters in Indian languages. Such schemes are tolerated as an input mechanism since they provide a faster means to input data into a computer when compared to keyboard mapping for a native Indian writing scheme.

Another problem with many of the transliteration programs available today is that they permit the use of alternate spelling for some characters. For instance, one vowel is spelled "uu", "oo", or "U". Note that the first two are in lower case letters and the last one is in upper case. Another example is the spelling for another vowel "au", "ou", or "ow". The same way one of the consonants is spelled "ph", "f", or "P". This kind of alternate spelling not only creates inconsistency but also makes it difficult to store information in a sorted order. For instance, if one were to look up a word in a dictionary, he has to look up all possible spelling combinations for a word. In English, the spelling for a word is fixed even though there are some variations between American English and British English. If the word "fish" were to be spelled "phish", it would require two entries in a dictionary. The present invention avoids this issue by assigning fixed spelling for Indian characters.

If English is used as the medium to represent a foreign language, it would be easy for the user, if that scheme implements the English conventions, such as case insensitivity, use of upper case to begin a sentence, use of upper case at the beginning of proper nouns, etc. Those who are skilled in English typing would prefer that the spelling convention does not employ the use of special keys. It would be very annoying to constantly use special keys to spell words in a different language. Even though English characters can be pronounced differently, there is a general consensus as to the pronunciation of syllables as well as words in the English language. Based on the same principle, a native English speaker is able to approximate the pronunciation of a new English word. Acknowledging these conventions in English, the present invention proposes a writing scheme for Indian languages using the English letters A through Z.

Another use of English to represent Indian languages is to read and write an Indian language without learning the proper shapes of the Indian characters or the required special character combinations to generate the characters in the Indian language. This is accomplished by introducing a new script, which closely resembles the English script and ensuring that the new script is uniform across different Indian languages.

The state of the art of using English characters to help input Indian language characters into electronic media is evident from the recent transliteration schemes, one for Devanagiri, supporting Hindi, Marathi, and Sanskrit, and the other for Malayalam. The first program is called AKSHARAMALA, which literally means alphabet. Details of this program can be found at the web site, aksharamala.com/aksharamala.html. This program requires the use of special symbols such as @ and ~ and differentiation between upper case letters and lower case letters. The second program is introduced recently by a major Indian newspaper, Deepika, for e-mail correspondence by millions of users. This program is called EKATHU, which literally means e-mail, and the mapping between English and Malayalam characters can be found at the web site, deepika.com/ekathustd/info2.htm. The spelling in this second program, EKATHU differs from the first program, AKSHARAMALA. This program also employs case sensitivity to differentiate between different characters and uses special characters. While the former program does not support Malayalam, the latter program is exclusively created for Malayalam.

One of the earliest schemes of transliteration for Indian languages is known as ITRAN. Details of this transliteration scheme can be found at aczone.com/itrans/TRANS.TXT. This program might have introduced the use of case sensitivity to differentiate between similar sounding Indian characters. In addition to case sensitivity, this program also uses other symbols. ITRAN tried to accommodate multiple Indian languages. But, it excluded Malayalam. In short, there is not a single transliteration scheme today, which is common to the major Indian languages. These and other transliteration programs focussed on the written form of the native Indian languages, rather than providing a mechanism to represent the native Indian languages using the English writing scheme. The current invention proposes a system and method for representing Indian languages using the English writing conventions, but strictly following a phonetic spelling scheme for the Indian languages.

Such a method for representing Indian languages in English is very useful for journalists, who may be able to use this common writing scheme to write articles in different languages. Since most journalists from India are quite familiar with the English keyboard, it should be much easier for them to learn this new scheme compared to learning different keyboard settings for different languages. In fact, the new scheme does not require any new software. Transliteration software is required only when it is necessary to translate from English to the native Indian script. Further, this scheme would be very beneficial for foreign language speakers learning an Indian language. With the familiar English alphabet, learning the Indian characters would be much simpler compared to learning to write those characters in the Indian script. In addition, typing can be done much faster since this scheme is case insensitive and there are no special keys to select or special settings to be done when using this new scheme of writing.

SUMMARY OF THE INVENTION

In accordance with the present invention, a method and system for representing Indian languages using the English alphabet is provided. The present invention is intended to provide a uniform phonetic representation for Indian languages. Indian characters are represented by the closest phonetic approximation in English. The present invention also uses as few English characters as possible to represent the corresponding Indian language text. It follows the English writing scheme of vowels following consonants, as opposed to vowel symbols preceding consonants or vowel symbols placed before and after a consonant, as is the case with many Indian languages. The present invention allows users of the new method to use the same vowel forms whether the corresponding Indian language represents them as stand-alone vowels or as vowel symbols. Further, the present invention gives the same meaning and value to a letter whether it appears as a capital letter or a lower case letter.

The present invention forms Indian characters from one or more English characters. Each such character is unique within a given context. For example, T is a character, H is another character, yet TH is a character different from T and H. The character TH is not a combination of the characters T and H. If a combination of the characters T and H is needed, it is represented as TXH, where X is used to separate T and H. Such contextual knowledge can be hidden behind software programs intended to translate text written in the English format to the corresponding Indian language text. Rules for writing Indian language text in the English format could be as simple as learning the new spelling for the Indian language characters. This process is further simplified since this spelling is uniform across different Indian languages.

The present invention only uses English characters A through Z to represent the sounds in the Indian languages, such as Malayalam, Hindi, and Tamil. The present invention is uniform across different Indian languages. It uses the English writing conventions, such as use of upper case at the beginning of a sentence, first letter of a proper noun, etc. Further, it provides a standard way to write Indian words in English without losing its pronunciation. For example, the word for India in Hindi is "Bharath". When pronounced, the first "a" is long and the second "a" is short. So, it would be more appropriate to write "Bhaarath" to indicate the first vowel is long and the second vowel is short. The present invention also attempts to imitate the way words are spoken as opposed to the way words are written. For example, when the word "Bhaarath" is written in Hindi, it is written as "Bhaaratha", where the last consonant "th" is followed by the short vowel "a", even though this last vowel is not pronounced.

According to one embodiment of the present invention, a method for writing Malayalam using the English characters is provided. Software programs have been written to verify that the present invention works as claimed in this submission. This system is used to write and read Malayalam using English characters as specified by this invention. Software is used only when conversion between the English characters and the corresponding Malayalam characters is required.

According to another embodiment of the present invention, a method for writing Hindi using the English characters is provided. Software programs have been written to verify that the present invention works as claimed in this submission. This system is used to write and read Hindi using English characters as specified by this invention. Software is used only when conversion between the English characters and the corresponding Hindi characters is required.

According to yet another embodiment of the present invention, a method for writing Tamil using the English characters is provided. Software programs have been written to verify that the present invention works as claimed in this submission. This system is used to write and read Tamil using English characters as specified by this invention. Software is used only when conversion between the English characters and the corresponding Tamil characters is required.

There are yet other Indian languages, such as Sanskrit, Telegu, Kannada, Bengali, Marathi, and Gujarathi. The present invention is also applicable to these and other Indian languages. The present invention is extendable to include special characters not usually used in the representative languages. The method used for representing Malayalam, Hindi, and Tamil is the same except any one of these three languages will only support a subset of the common method for representing Indian languages using the English writing scheme, i.e., not all capabilities of this scheme are applicable to any given language.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which:

FIG. 1 shows the base vowels present in Indian languages. The vowel forms shown in FIG. 1 are the vowel forms used when these vowels appear on their own, i.e., when they are not combined with consonants. The English character representation for the Indian language characters is referred to as B-Script. Malayalam is a South Indian language, which is also the official language of Kerala. Hindi, Marathi, and Sanskrit use Devanagiri script. Other North Indian language scripts are based on Devanagiri. When an entry is not applicable or not required, it is indicated by a "-".

FIG. 2 shows the vowel symbols, corresponding to the stand-alone vowels shown in FIG. 1. Indian languages use vowel symbols when vowels are combined with consonants. In the English character representation, referred to as B-Script, for the Indian vowels, there is no distinction between the stand-alone forms of the vowels and the vowel symbols used in combination with consonants. This distinction between the two forms of the vowels is necessary when a text written in B-script is translated to an Indian script. This distinction can be inferred from the context of the vowel. FIG. 2 uses two consecutive dots, ".." to show the relative placement of vowel symbols when they are combined with consonants.

FIG. 3 shows the base consonants present in Indian languages. Even though not all characters are supported in all languages, translation can be made to the most similar character in a particular language. B-script is intended to provide a common character set to represent the various sounds found in Indian languages. In FIG. 3, the consonants are shown to be combined with the vowel A 101.

FIG. 4 shows some additional symbols and characters present in Indian languages. There are other letters and sounds either native to a particular Indian language or used to accommodate foreign sounds in some languages, but the characters given in FIG. 1 through FIG. 4 are sufficient to explain the concepts of the present invention.

DETAILED DESCRIPTION

FIG. 1 categorizes vowel sounds into three groups, short vowels 101 through 105, long vowels 106 through 110, and other vowels 111 through 120. English character A is used to represent the short vowel 101. English character E is used to represent the short vowel 102. English character I is used to represent the short vowel 103. English character O is used to represent the short vowel 104. English character U is used to represent the short vowel 105. All letters are treated the same whether they are written in the upper case or lower case.

Of the vowels shown in FIG. 1, Hindi and related languages using the Devanagiri script do not support short E 102 and short O 104, which are present in Malayalam and other south Indian languages. However, the short E 102 and short O 104 can be translated to the Devanagiri EE 107 and OO 109 and a native speaker can understand the distinction between the short and the long forms. This distinction is important if it is necessary to represent South Indian words using these short vowel forms are written in Hindi.

Long vowels 106 through 110 are used in most Indian languages. Writing the corresponding short vowels twice next to each other forms long vowels. The English character string AA represents long vowel 106. The English character string EE represents long vowel 107. The English character string 11 represents long vowel 108. The English character string OO represents long vowel 109. The English character string UU represents long vowel 110. All letters are treated the same whether they are written in the upper case or lower case. If B-script is used exclusively for an Indian language, which does not support both short and long forms of these vowels, then either representation in B-script can be mapped into the same character in the Indian language. Some Devanagiri fonts have characters to indicate the above distinction between short E 102 and long EE 107. The same way, such fonts also distinguish between short O 104 and long OO 109. B-script maintains this distinction, even if software programs written exclusively for specific languages may only support the characters found in that language and may or may not maintain such distinctions.

In addition to the short vowels 101 through 105 and long vowels 106 through 110, there are other vowels 111 through 120. Vowel 111 is formed from the short vowels A 101 and I 103, and is represented by the English character string AI. Vowel 112 is formed from the short vowels A 101 and U 105, and is represented by the English character string AU. The English character string RW represents vowel 113. Character 115 is formed from the English character string LW. Character 114 is the long form of character 113 and is represented by the English character string RWU. Character 116 is the long form of character LW 115 and is represented by the English character string LWU. Devanagiri script supports characters RWU 114, LW 115, and LWU 116. Malayalam used to support LW 115.

Character AMX 117 is formed from character A 101 and a dot, known as BINDU, placed above A 101. The closely related character ANX 118 is also formed from character A 101 and a different symbol known as CANDRABINDU. Both these characters follow an independent vowel and produce a nasal sound, one short and the other long. The sound generated can be approximated to the consonant M or N in English. Therefore, the English consonants M and N are selected, along with a preceding independent vowel and the silent character X, to represent these vowels. For normal reading, the use of X in these contexts is not necessary. However, these characters are spelled this way to aid software programs when translating from the English character representation to the native Indian scripts. It is possible to write intelligent programs to distinguish between the use of M and N to represent consonants M 325 and N 320 and the use of M and N to indicate vowels AMX 117 and ANX 118 and their respective symbols MX 217 and NX 218 without the presence of the silent character X.

Character AM 119 is present in Malayalam. Other languages can represent this character as character A 101 followed the character M 325 without any vowel following it. Another way to map the character AM 119 in Devanagiri is to map it to the character AMX 117. Character AM 119, character AMX 117, and character ANX 118 can all follow a vowel other than A 101. In FIG. 1 they are shown to follow the vowel A 101. When they follow the vowel I 919 103, they can be written as IM, IMX, or INX. The character AMX 117 and the character ANX 118 in Devanagiri can be translated to the character AM 119 in Malayalam. Tamil does not specify an equivalent vowel. In Tamil, these characters are written as the specified vowel, corresponding to the vowel A 101, followed by the consonant M 325 followed by the no vowel symbol.

FIG. 2 shows the vowel symbols used when vowels are combined with consonants. The vowel symbols 201 through 220 correspond to 101 through 120. Vowel symbol A 201 is left intentionally blank to indicate it does not have any special symbol. The presence of vowel A 101 is represented by the absence the specific mark 406 used to indicate the absence of a vowel along with a consonant when the text is written in Devanagiri or Malayalam. There is a corresponding symbol, representing the absence of a vowel along with a consonant in other languages as well. When Indian languages are written using the English characters, these vowel symbols 201 through 220 are distinguished from their corresponding representations 101 through 120 based on their context. If they appear at the beginning of a string, they take the stand-alone form 101 through 120. If they follow a consonant, they are written using the vowel symbols 201 through 220. For Devanagiri, FIG. 2 shows the short E symbol 202 and the short O symbol 204 the same as their longer counterparts 207 and 209 since in Devanagiri there is no difference between the short and long forms of E 102 or O 104. Some Devanagiri fonts have symbols to distinguish between the short E and O and their corresponding long forms EE and OO. When a font distinguishes the short and long forms, the short forms are used to represent the corresponding short vowels present in South Indian languages, such as Malayalam and Tamil.

Vowel symbol 203 corresponds to vowel I 103. Vowel symbol 205 corresponds to vowel U 105. In Malayalam, vowel symbols I 203 and U 205 are placed following a consonant, while vowel symbol E 202 is placed before a consonant, and the vowel symbol O 204 surrounds a consonant. The first part of the vowel symbol O 204 is placed before a consonant and the latter part is placed after a consonant. In Devanagiri, the vowel symbol E 202 is placed above a consonant, vowel symbol I 203 is placed before a consonant, vowel symbol O 204 is placed after a consonant, and vowel symbol U 205 is placed beneath a consonant.

Vowel symbol 206 corresponds to vowel AA 106. Vowel symbol AA 206 is placed after a consonant. Vowel symbol 207 corresponds to vowel EE 107. Vowel symbol EE 207 is placed before a consonant in Malayalam and above a consonant in Devanagiri. Vowel symbol 208 corresponds to vowel II 108. Vowel symbol II 208 is placed after a consonant. Vowel symbol 209 corresponds to vowel OO 109. In Malayalam, the first part of the vowel symbol OO 209 is placed before a consonant and the latter part placed following a vowel. In Devanagiri, vowel symbol OO 209 is placed after a consonant. Vowel symbol 210 corresponds to vowel UU 110. Vowel symbol UU 210 is placed after a consonant in Malayalam while it is placed beneath a consonant in Devanagiri.

Vowel symbol 211 corresponds to vowel AI 111. Vowel symbol AI 211 is placed before a consonant in Malayalam while it is placed above a consonant in Devanagiri. Vowel symbol 212 corresponds to vowel AU 112. Vowel symbol AU 212 is placed after a consonant. Vowel symbol 213 corresponds to vowel RW 113. In Malayalam, vowel symbol RW 213 is placed after a consonant. When written, vowel symbol RW 213 appears to the bottom right corner of a consonant. In Devanagiri, vowel symbol RW 213 is placed beneath a consonant. Vowel symbol 214 corresponds to vowel RWU 114. Vowel symbol RWU 214 is placed beneath a consonant. Vowel symbols 214 through 218 are not used in Malayalam. Vowel symbol 215 corresponds to vowel LW 115 and is placed beneath a consonant. Vowel symbol 216 corresponds to vowel LWU 116 and is placed beneath a consonant. Vowel symbol 217 corresponds to vowel AMX 117 and is placed above a consonant. Vowel symbol 218 corresponds to vowel ANX 118, and is also placed above a consonant. Vowel symbols MX 217 and NX 218 can be combined with vowels other than vowel A 101. Vowel symbol 219 corresponds to vowel AM 119 and is placed following a consonant. Even though vowel symbol M 219 is generally shown to be combined with the short vowel A 101, it can follow other vowels as well. Vowel symbol 220 corresponds to vowel AHX 120. Vowel symbol HX 220 is placed after a consonant followed by a vowel.

There are two other vowels occasionally found in Hindi print media. They are used to represent foreign vowels. The first one is represented in B-script by the English character string AE and the English character string OE represents the second one. This special spelling is selected to show that the pronunciation is different from the English pronunciation and the speaker intends to show the distinction in the written form. The first vowel is the first vowel in “caricature”, as pronounced by Hindi speakers, and is represented by the vowel AE. The Devanagiri representation for AE is the vowel E 102 or EE 107 along with the vowel symbol NX 218 without the dot. This is also known as CHANDRA E. The second vowel is the first vowel in “on-line” or “cross”, as pronounced by Hindi speakers, and is represented by the vowel OE. The Devanagiri representation for OE is the vowel O 104 or OO 109, but replacing the top portion, which is a slanted short line, with the vowel symbol NX 218 without the dot. This is also known as CHANDRA O.

FIG. 3 shows consonants in Devanagiri and Malayalam and their corresponding representation in B-script. Consonants are shown to be combined with vowel A 101. When the vowel A 101 is combined with a consonant, no vowel symbol is added to that consonant. Here, consonants K, KH, etc. are written as KA 301, KHA 302, etc. to indicate that these consonants are combined with the vowel A 101. Vowel A 101 is not shown since when this vowel is combined with a consonant, it just shows the pure form of a consonant. One can argue that the vowel symbol 201, corresponding to vowel 101 is added to these consonants since its presence causes the no vowel symbol 406 to be removed from the consonant K 301. If this consonant were to be written without the vowel A 101, it would be shown as character 301 combined with the symbol 406.

Consonants 301 through 336 are used in Malayalam. Hindi, which uses the Devanagiri script, supports most of these characters. Even though Tamil, a South Indian language, does not use a number of these consonants, it has an extra consonant 415, which is present in spoken Malayalam, but is missing in the written form. Malayalam and Hindi have only one form for consonant NN 415 and N 320. Consonants R 327 and RH 328 are pronounced in Hindi, but Hindi has only one written form R 327. Hindi also does not have consonants LH 330, and ZH 331.

Character 301 is the first consonant in Indian languages and is represented by the English character K. When a consonant is written without a vowel, the Indian script generally indicates the absence of a vowel together with a consonant by adding the symbol 406. While FIG. 4 gives only two representations of character 406, one for Devanagiri and the other for Malayalam, there are corresponding symbols in other Indian languages. The next character 302 is similar to character K 301, and is represented by the English character string KH. The present invention consistently uses addition of the English character H to create a similar character if it is feasible to do so. Other examples are characters GH 304, CH 307, JH 309, NH 315, TH 316, DH 319, BH 324, LH 330, RH 328, ZH 331, and SH 334. The English character G represents Indian character 303. The English character string GH represents Indian character 304.

The English character string NG represents the Indian character 305. In Malayalam, the character 305 is rarely used. The more frequent form of this consonant is its doubled form, which is represented by the English character string NGH or NGNG. The NGH spelling is preferred since it is shorter and it follows the convention, introduced by the present invention, of using H to double characters represented by two English characters. Since H by itself is a character 336 found in the Indian language, it may not be clear if H is a character by itself or if it is part of another character, such as character LH 330 or NH 315. This ambiguity is resolved by the rule introduced by the present invention that if a character string, representing an Indian character, appears along with another character string to form a character in the Indian language, the represented character is the character represented by the longest English character string.

The present invention has also introduced another convention to make it feasible for the character H 336 to follow characters such as L 329 or N 320. When the character H 336 appears following one such character, the English character X is used between these characters. For example, NXH is interpreted as character N 320 followed by the dummy character X, which is suppressed, followed by the character H 336. If N and H were to appear without the X in the middle, it is interpreted as character NH 315. Characters 301 through 305 form a group known as the K-group or KAVARGAM. Within this K-group, Tamil only supports characters K 301 and NG 305. In Tamil, character K 301 is substituted for characters KH 302, G 303, and GH 304.

Characters 306 through 310 introduce the next group of characters known as the C-group or CAVARGAM. Here again, Tamil traditionally only supported the first and the last characters in this group. Character J 308 has been adopted from Malayalam into Tamil and is used in print media. The English character C. represents character 306. When words in Indian languages using this character are written in English, the English character string CH has represented this character. But, this convention has been discarded to make the new script consistent with the spelling of other characters in the alphabet. Character 307, which is very similar to character 306, but pronounced with a bit more emphasis is represented by the English character string CH. Character 308 is represented by the English character J and character 309 is represented by the English character string JH. Character J 308 and JH 309 are similar sounding characters, where J 308 can be considered less aspirated compared to JH 309. The English character string NJ represents character 310. This character NJ 310, which is the last character in the C-group, is actually very close to character NG 305, which is the last character in the K-group.

Characters 311 through 315 form the third group of consonants in Indian languages. This group is known as the T-group or TAVARGAM. Characters 316 through 320 form the next group of characters known as the TH-group or THAVARGAM. The first four characters in both these groups, the T-group and the TH-group, used to be spelled by the English character strings T, TH, D, and DH. For transliteration purpose, case sensitivity has been introduced by many software programs to distinguish between the letters in these two groups. This has created a lot of confusion and transliteration programs were forced to depend on case sensitivity to differentiate between these eight characters. The present invention clearly separated these two groups of characters. Character 311 is assigned the English character T. Character 313 is assigned the English character D. The character closer to the character T 311 is character 312. This character 312 is assigned the spelling TD, indicating that this character is similar to T 311, but is different. The decision not to add H to character T 311 to form character 312 has been made since it would conflict with the spelling in the TH-group. The same way, character 314 has been spelled DT since it is close to character D 313. The English character string NH represents the last character in the T-group 315. It has resemblance to the last character in other groups of characters. This is quite evident from the spelling of the last characters in the first four groups of five characters each. These last characters are spelled NG 305, NJ 310, NH 315, and N 320. All these characters begin with the English character N. These characters are differentiated by the addition of G, J, and H to the character N 320.

Character 316 is the first character in the TH-group and is represented by the English character string TH. The English character string TJ represents character 317. Similarly, the English character string DJ represents character 318. The English character string DH is used for character 319. The English character N represents character 320. Characters 311 through 319 were taken together as a group to resolve the conflicting and case-sensitive spelling used by many previous transliteration schemes for the Indian languages. The system and method proposed by the present invention clearly distinguishes all characters in this group without any dependency on case-sensitivity. At the same time, the present invention restricted all characters in this extended group to a maximum of two English characters. There is also a pattern to the spelling given to these characters. The first group of characters 311 through 314 uses only two characters T and D, where the first and the third characters are assigned T 311 and D 313 respectively, and the other two 312 and 314 begin with the same characters but is complemented by the other character, either T or D. A similar pattern is also present in the second group of characters 316 through 319. Here, character TH 316 can be thought of as the next character to T 311. The same way, character DH 319 is the next character D 313. The other two characters TJ 317 and DJ 318 are formed from T and D similar to the characters TD 312 and DT 314, but the second character has been replaced with a J. Again, characters N 320 and NH 315 can be thought of as related.

There is another character, which closely resembles character N 320. This character NN 415 is shown in FIG. 4. This character is present in Tamil. Characters N 320 and NN 415 are distinctly pronounced in Malayalam. But, in Malayalam, both these characters N 320 and NN 415 are written the same way. The same is true for Hindi as well. Most speakers of Hindi may not even be aware of this distinction.

The fifth group of consonants in Indian languages is the P-group or PAVARG. The P-group characters are 321 through 325. Character 321 is represented by the English character P and character 323 is represented by the English character B. The English character F represents character 322 and the English character string BH represents character 324. The English character M represents character 325.

The next group of characters consists of seven characters. Within this group, characters R 327 and RH 328 have only one form in Hindi. Malayalam and Tamil have two distinct characters each. The same way, Hindi has only one form for characters L 329 and LH 330. It is more accurate to say that Hindi does not have character LH 330. However, this character is present in the Devanagiri script. Another character ZH 331, present in Tamil and Malayalam, is also absent from Hindi. In Devanagiri, the character ZH 331 is included to represent the equivalent character in Dravidian languages, to which Malayalam and Tamil belong.

Character 326 is represented by the English character Y. Character 327 is represented by the English character R and the closely related character 328 is represented by the English character string RH. The English character L represents character 329 and the English character string LH represents character 330. Even though character ZH 331 is counted among this group, its pronunciation is related to the next group of characters. The English character string ZH represents the character 331. The English character V represents character 332.

Character ZH 331 is found as the last letter in the word "Tamil". The spelling used in English and many other languages does not represent the correct pronunciation of this word. If written in Hindi, the spelling for this word would be "Thamil", which correctly spells the first syllable, but continues to misspell the last syllable. Hindi substitutes character ZH 331 with character 329 L. If written in B-script, "Tamil" would be spelled "Thamizh", indicating that the first letter is character TH 316 and the last letter is character ZH 331. Correct spelling of Indian words is a benefit of the present invention as is evident form this example.

An example of the benefit of the present invention is evident form the spelling given to "Malayalam" in English. If "Malayalam" were to be spelled using the spelling convention of the present invention, it would read "Malayaalham". When spelled following the present invention, non-native speakers can understand that the third vowel in "Malayaalham" is long while the other vowels are short. The same way, they can distinguish the second consonant L 329 from the fourth consonant LH 330. The conventional spelling does not make this distinction.

The final group of consonants in Indian languages consists of characters 333 through 336. Character 333 is represented by the English character S. The choice of S to represent character 333 is made since this character is closer to the English pronunciation of S when compared to other characters in Indian languages. Character 334 is represented by the English character string SH. Character 335 is designated the English character Z. This is not an exact match. But, it is the closest once the English character S has been taken away for character 333. Further, this character is also pronounced not the same as the English character S. Character 336 is represented by the English character H.

FIG. 4 shows special characters present in some Indian languages. Character 401 through 405 are regarded as semi-consonants and are used in Malayalam. Character 406 is a symbol indicating the absence of a vowel along with a consonant. When an Indian language is written using the English characters as described in the present invention, absence of a vowel along with a consonant is understood by the absence of a vowel following a consonant. But, in some contexts, in the absence of a vowel together with a consonant, some consonants may take two different forms and pronunciation as is the case in Malayalam with characters 401 through 405. In this context the English character X is used to differentiate between the two different forms of such consonants. In Malayalam, either form may be used if such consonants appear in the middle of a string. However, the above distinction is maintained when such consonants appear at the end of a string. This distinction is realized in Malayalam by placing an X at the end of such consonants when they appear at the end of a string and are not intended to be semi-consonants 401 through 405.

Another use of the English character X is to explicitly show that the user intends the form of a consonant not followed by a vowel. This case is evident in Hindi, where the Hindi vowel corresponding to Malayalam character A 101 is not pronounced but written as if it is followed by that vowel. For example, the word for India in Hindi is "Bhaarath", which is written in Hindi as "Bhaaratha". Here, there is a final vowel symbol A 201, which removes the no vowel symbol 406 from the final syllable. If a writer's intent is the equivalent of character 406, then it must be clearly specified. Otherwise, the default character 201 is understood even though it is not explicitly specified when written using the English characters. Note that this is a special case for Hindi. Malayalam and Tamil do not have this problem. In Malayalam, "Bhaarath" is translated from the spoken word to equivalent Malayalam characters and the last syllable is shown with the no vowel symbol 406. The equivalent Malayalam word for "Bhaarath" is "Bhaaratham", which is spelled with the final vowel AM 119. Again, this example shows how the new invention becomes a very useful tool in representing the Indian languages phonetically.

There are no Hindi equivalents to characters 401 through 405. In Hindi, this distinction of two different forms of consonants without any vowel combination disappears. Hindi treats them equivalent to the corresponding characters without followed by a vowel. Character 401 corresponds to character 329 and is represented by the English character L. Character 402 corresponds to character 330 and is represented by the English character string LH. Character 403 corresponds to character 320 and is represented by the English character N. Character 404 corresponds to character 315 and is represented by the English character string NH. Character 405 corresponds to characters R 327 and RH 328 and is represented by the English character R.

FIG. 4 also shows some of the extensions to the characters introduced in FIG. 3. Character 406 is explicitly indicated by the English character X. But, it is mostly understood by the context, where a consonant if not followed by a vowel indicates the need for character 406. The convention followed by the present invention is not to explicitly indicate the absence of a vowel following a consonant unless it is required to do so in order to avoid any ambiguity as is the case in Hindi, where the ending vowel symbol A 201 in a word is not pronounced but written. Another context where there is a need to explicitly indicate the presence of this character 406 is to distinguish between the semi-consonants in Malayalam 401 through 405 from their related consonant forms without being followed by a vowel. Non-native speakers of Malayalam may not recognize this distinction. But, it is quite evident when they appear at the end of a word. The semi-consonant forms are preferred in most contexts when they appear in the middle of a word.

Character 407 is found in Sanskrit, where it is often used to replace the character A 101 when it is following character EE 107, 207 or character OO 109, 209. This character is also used following the long vowel AA 102, 202. The English character string XA, when preceded by a vowel represents character 407. If character 407 is repeated, it is shown as XAA. Character 408 is the abbreviation sign in Hindi and is represented by the English character X if it is preceded by a vowel and followed by a blank character. Characters 407 and 408 are not used in Malayalam. Character XA 407 can be mapped to vowel A 101 in Malayalam. Character 409 is the equivalent of a period in English and is represented by the English period sign or a dot.

Characters 410 through 417 are character extensions to support special characters in Indian languages. Some of these characters represent foreign characters adopted by Indian languages, while a few of these characters are native to some Indian languages and are not commonly used by speakers of other Indian languages. Character 410 is similar to character K 301 and is represented by the English character Q. Character 411 is represented by the English character string KQ. The English character string GW represents character 412. The doubled form of GW 412 is represented as GWH. The English character string DW represents character 413. The doubled form of DW 413 is represented as DWH. The English character string DTW represents character 414.

Character 415 is a base consonant found in Tamil and is closely resembles the character NH 315. The English character string NN represents character 415. The doubled form of this character is NNH and the doubled form of N 320 is NXN. Here, as in a few other cases, the use of the silent character X is required when doubling single letter characters. The English character string PF represents character 416. The English character string YW represents character 417. The doubled form of YW 417 is represented as YWH.

Characters 418 and 419 are peculiar to Malayalam. In fact, these two characters are pronounced in English and is absent in Hindi. Character 418 is represented by the English character string TT and pronounced T as in the English word "Time". Since the English character T has already been assigned to the more general character T 311, TT is used for this character. In Hindi and other Indian languages, which do no support this character, it will be interpreted as doubling of character T 311. In Malayalam, since TT 418 is a valid single character, the doubling of T 311 is represented as TXT, where X separates the consecutive appearance of the character T 311 without any intervening vowel. As such in Malayalam, the doubled form of character T 311 is written as TXT, while TT represents character 418. Character TT 418 is written in Malayalam as if two consecutive characters RH 328 and RH 328. They are sometimes written top and bottom, as shown in FIG. 4 or side by side. FIG. 4 also shows the Hindi equivalent of character 418 as the doubled form of character T 311 since that is the closest approximation currently available in the Hindi or Devanagiri character set.

The English character string NT represents character 419. The pronunciation of this character in Malayalam is the same as "nt" in "saint" or "paint". When written in Malayalam, this character is formed from the semi-consonant N 403 and the consonant RH 328. But, it is pronounced as its English representation NT. Hindi does not support this character. The closest representation in Hindi is the combination of characters N 320 and T 311.

The present invention also leaves room for character extensions. One such example is the combination of the character M 325 and character P 321, which forms a new character MP. In Malayalam, MP is written as a distinct character. There is another character AM 119, which can follow a consonant. When AM 119 is followed by P 321, it is not easy to differentiate it from A 101 followed by M 325 and P 321. Since MP is a recognized character in Malayalam and AM is a recognized vowel, when AM 119 is immediately followed by P 321, the dummy character X must be inserted to explicitly separate these two characters. Such language specific rules allow specialization without breaking the general scripting rules in B-script. For a language, which does not support the distinct character MP, the characters MP and MXP are equal.

In Hindi, when a consonant is combined with another consonant, the first consonant is written half way and the second consonant is then attached to the first consonant. There are special rules in Devanagiri how to write combination letters. While the representation of these combined characters can be handled by transliteration programs, the present invention makes it easy for the users to simply write the consonants next to each other to form a combined Indian character provided juxtaposition of the two characters does not lead to ambiguity. In Malayalam, when a combined character is not defined as a distinct character, the first character is written with the no vowel symbol 406, followed by the next consonant. This method is also followed in Hindi as an alternate way to writing the half character or its equivalent symbol first to be followed by the ending consonant appearing in its full form. Note that it is permissible to place the dummy character X between two consonants if there is no intervening vowel immediately following the first consonant. If a vowel follows the first consonant, the first consonant is segregated from the second consonant by the vowel following the first consonant.

Another example of character extension is the Malayalam ST, which is the result of the character S 333 and TT 418. The pronunciation of the character ST is the same as "st" in the English word "study". Hindi does not support this character. The closest approximation is combination of the characters S 333 and T 311. Note that the present invention is complete even without the addition of the new character ST, which is interpreted as the combination of S 333 and TT 418 in Malayalam and as the combination of S 333 and T 311 in other languages. The new writing scheme could have used the spelling STT instead. However, this new character ST is introduced since combination of S 333 and T 311 is not required for Malayalam and TT is not a character supported by other Indian languages. In case there is a need to write S 333 and T 311 as a combined character in Malayalam, it can be achieved by writing SXT. Characters such as ST, NT and TT have a legitimate place in the Indian character set. There are so many English words commonly used in Indian languages and mispronounced simply because they are written using characters with a different pronunciation. This same argument can also be applied to languages that do not support many characters required to pronounce words in other languages. If such differences are subtle, they can be ignored. But, in many cases, these differences are so obvious. The present invention can alleviate this problem by providing a common character set for Indian languages.

Yet another example of the ability to extend the character set introduced by the present invention is the use of character combinations, where the character LH 330 follows K 301, G 303, P 321, F 322, B 323, M 325, V 332, S 333, Z 335, or H 336 in Malayalam. In Malayalam, the character LH 330 is not substituted by the character L 329 in this context. Therefore, new combined characters such as KL, GL, PL, FL, BL, ML, VL, SL, ZL, and HL can be created without any ambiguity either in Malayalam or any other Indian language. In Malayalam, these combinations would be interpreted to mean the combination with the character LH 330, while in other Indian languages, this could be interpreted as combination with the character L 329. Also note that Hindi substitutes LH 330 with L 329. It is not necessary for these language specific extensions to be implemented by transliteration programs or used in ordinary writing utilizing the present invention. Such programs or writing can support either of these conventions or both of these conventions when representing these character combinations.

Characters TT 418 and NT 419 are examples of the discrepancy between the popular belief that Indian languages are written the same way they are spoken. The popular belief is true once the peculiar rules of writing the Indian languages are known. From the above descriptions, it should be clear that the present invention is very useful to unambiguously represent the various Indian languages, which have different character sets and writing conventions. A unique way to represent Indian languages in the written form is also very useful to adopt text to speech and speech to text technologies for the Indian languages.

The present invention followed some rules very consistently in giving English character representations to the Indian consonants. One such rule is to represent a basic consonant by a single character if it is possible to do so. Examples are characters K 301, G 303, C 306, J 308, T 311, D 313, N 320, P 321, F 322, B 323, M 325, Y 326, R 327, L 329, V 332, S 333, Z 335, and H 336. Here the consonants are shown without any accompanying vowels.

Another rule is to represent a similar sounding consonant by the addition of the English character H to a consonant represented by a single English character if it is possible to do so. Examples are characters KH 302, GH 304, CH 307, JH 309, NH 315, DH 319, BH 324, RH 328, LH 330, ZH 331, and SH 334.

Another rule has been to use as few English characters as possible to represent the Indian characters without making it difficult for the average user to distinguish between the different characters. Examples are the use of the English characters T and D to form the characters T 311, TD 312, D 313, and DT 314. Another example is the use of the English character J to form characters TJ 317, DJ 318, and NJ 310.

Yet another rule followed in the formulation of the characters is not to use similar sounding character strings to represent different Indian characters. For instance, the English character strings "Th" and "th" are the same when spoken. The same way, "T" and "t" are same. From a speaker's point of view, there is no difference between "D" and "d". The fact that it is an extremely difficult task to accomplish is evident from the violation of this rule by the numerous transliteration programs available in the market today for Indian languages. Many transliteration programs require the users to distinguish between upper case letters and lower case letters. In many cases, whether one of the English characters is a lower case character or an upper case character distinguishes one Indian character from another. The present invention is case insensitive and invention uses only one or two characters for all basic consonants.

Even though the present invention allows character combinations on an arbitrary basis, software programs can be written to restrict character combinations to only permitted combinations of characters in an Indian language. This can be accomplished by introducing a spell checker for the concerned language. Further, such software programs can also perform specialized mapping from the English script to the native Indian language script. For example, in Malayalam, when the character V 332 follows another consonant forming a combined character, the first consonant is written with a special symbol to indicate that the new character is formed with the addition of the consonant V 332. The same way, when the character Y 326 follows another consonant forming a combined character, the first consonant is written with a special symbol to indicate that the new character is formed with the addition of the consonant Y 326. In Malayalam, there are special symbols for RH 328, Y 326, and V 332. Another example is the numerous combined characters in many Indian languages. Even though these combined characters could be written as separate characters with the use of the character symbol 406, many readers would prefer to use the original combined characters they are quite familiar with. As such, the present invention used in conjunction with specialized software to do translation between the English script and the native Indian script would help preserve the artistic nature of Indian writing.

Another advantage of the present invention is font substitution when translating from the English format into a specific Indian language script. Compatibility between different fonts is achieved via software programs, which can map the text written using the English characters into the native language characters and in this process use a user-selected font for the Indian language representation. The source text can still be preserved in the English format and be translated to an Indian script on demand.

How the present invention simplifies the writing scheme for Indian languages is evident from the fact that the present invention provides a single form or spelling for all characters in the new script. Note that Indian languages have two different forms for the vowels, one when they appear by themselves and another when they are combined with consonants. The same way, many consonants also have different forms depending on whether a consonant is combined with another consonant or not. Sometimes, the combined consonants take a different shape, thus becoming a distinct character in the alphabet. Further complicating the writing scheme, some characters may be written differently depending on where they appear within a string. For example, in Hindi, the character R 327 may be indicated as a symbol appearing on the top of another consonant when it is the first letter in a combined character. The same convention was also used in Malayalam for the character RH 328. Again, in Malayalam, if the character RH 328 is combined with a consonant and RH 328 is the second character, it is indicated as a symbol appearing before the second consonant.

Given above are some examples of how complicated the character combinations in Indian languages can be. However, the present invention simplifies the Indian writing scheme by permitting a single form for the vowels whether they appear on their own or are combined with consonants. Again, when consonants are combined they are placed next to each other. There is no issue of placing some symbol before, after, above, or below as would be the case if the same text were written in the native Indian script. A few frequently used combined characters are also given simplified spelling.

Another advantage of the new invention is the simplicity in entering data into computers. Most computer users are used to the QWERTY or ASCII keyboard. Irrespective of what Indian language they are using for data entry, they are now allowed to use the ASCII keyboard as they have always done. If transliteration to the concerned Indian language is desired, a macro can be used to do translation of a selected portion of a text or the whole text within a file. Macros are powerful tools available within almost all major word processing products. For instance, software programmers can use the macro facility provided by Microsoft Word to write their own macros to do transliteration from the English spelling, as specified by the present invention, to the desired Indian language script. They are also free to choose their favorite font or fonts for the target language.

If multiple languages were to be written within a document using the present invention, each supported language can be differentiated either via automatic language checking or via explicit indication given by the writer. An explicit indication can be given to the transliteration program through key words, such as HN for Hindi and ML for Malayalam. The same way, specific fonts can also be selected via key words.

Another benefit of the present invention is the ability to include English words or sentences within an Indian language text. English or foreign text could be indicated via a key word. A software program written to verify the accuracy of the present invention used a convention to enclose English words or sentences, not to be translated by the transliteration programs, within square brackets. The open square bracket instructed the software program to stop translating and the closed square bracket informed the software program to resume translation. Note that this convention or an equivalent convention is not required for transliteration programs that do not support intermixing of English or a foreign language with Indian languages. If transliteration to the Indian script is not a requirement and the present invention is used as the normal medium to represent Indian languages, English words or phrases could be imbedded within the Indian language text using any appropriate convention since the written text is intended for a human reader.

The present invention does not prevent software programs from providing a mechanism to use alternate spelling for words frequently used in a given context, by a given user, or by a group of users. This can be done by entering words stored in a dictionary with a special indication, such as beginning a word with an apostrophe. Since apostrophe is not used in normal spelling, that could serve as an indication to the software program to look up the dictionary and substitute that word by the stored string. This scheme can serve as a speedy way to enter often used words, phrases, or even sentences into a text file.

The present invention also gives a uniform input method for Indian languages. If key entries were to be made using key mapping, the users have to become familiar with the key mapping for each Indian language they are likely to use. The present invention simplifies this issue by eliminating the need for learning any new key mapping. The users are required to learn only one spelling for the Indian characters. When they encounter a new Indian language, they only need to learn the few characters that may not be present in the Indian languages they are familiar with. Also note that the Indian text using the English writing scheme, as stated in the present invention, appears the same as any English text.

The system and method of the present invention is also useful for writing many of the native Indian languages, which are only spoken and lack a writing scheme. The present invention provides a means to write an Indian language using the English writing conventions and be able to translate that writing to any font supported in a language. It should be noted that there are many written forms for a single Indian character. Several Indian languages use the Devanagiri character set, including Hindi, Sanskrit, and Marathi. But, Malayalam, Tamil, Telegu, Kannada, Gujarathi, Punjabi, Bengali, and many other languages have their own character sets. Even though most of the characters are pronounced the same, they are written differently and the writing conventions are also different. In addition to the different character sets, there is further confusion due to incompatible fonts. For instance, Malayalam has more than a dozen fonts available for every day use. But, these fonts are not compatible with each other and it is not possible to do font substitution without the aid of special software programs. The present invention makes it easy for software programmers to use a common input mechanism for transliteration programs. The present invention is independent of any fonts available in any Indian language and presents a common system and method for writing Indian languages.

What is claimed is:

1. A transliteration system comprising:

an input device inputting at least one English character;

an output device outputting at least one Indian language character;

a computer program converting the said input to the said output based on a character mapping table and a set of character mapping rules;

the said character mapping table:

specifying a superset of Indian language characters, where:

English characters, A, E, I, O, U, AA, EE, II, OO, UU, AI, AU, RW, RWU, LW, LWU, AMX, ANX, AM, and AHX are assigned respectively to Indian language vowels, അ, എ, ഇ, ഒ, ഉ, ആ, ഏ, ഈ, ഓ, ഊ, ഐ, ഔ, ഋ, ॠ, ऌ, ॡ, अं अँ, അം, and അഃ, where Indian language vowels are shown in Malayalam except for RWU, LW, LWU, AMX, and ANX, which are shown in Devanagiri;

English characters, K, KH, G, GH, NG, C, CH, J, JH, NJ, T, TD, D, DT, NH, TH, TJ, DJ, DH, N, P, F, B, BH, M, Y, R, RH, L, LH, ZH, V, S, SH, Z, H, Q, KQ, GW, JW, DW, DTW, NN, PF, YW, TT, and NT are assigned respectively to Indian language consonants, ക, ഖ, ഗ, ഘ, ങ, ച, ഛ, ജ, , ,S, O, ഡ, ഢ, ണ, ത, ഥ, ദ, ധ, ന, പ, ഫ, ബ, ഭ, മ, യ, ര, റ, ല, ള, ഴ, വ, സ, ഷ, ശ, ഹ, क़, ख़, ग़, ज़, ड़, ढ़, ன, फ़, य़, ഋ, and ന്റ, where Indian language consonants are shown in Malayalam except for KG, GW, JW, DW, DTW, PF, and YW, which are shown in Devanagiri, and NN, which is shown in Tamil;

English characters, A, E, I, O, U, AA, EE, II, OO, UU, AI, AU, RW, RWU, LW, LWU, AMX, ANX, AM, and AHX are also assigned respectively to Indian language vowel symbols, none, െ.., .ി, െ..ാ, .ു, ..ാ, േ.., .ീ, േ..ാ, .ൂ, ൈ.., ..ൗ, ..ൃ, ◌ॄ, ◌ॢ, ◌ॣ, ◌ं, ◌ँ, ..ം and ..ഃ, where Indian language vowel symbols are shown in Malayalam, with dots showing position of accompanying consonant, except for RWU, LW, LWU, AMX, AND ANX, which are shown in Devanagiri;

English characters, L, LH, N, NH, and R are also assigned respectively to Indian language semi-consonants, ൽ, ൾ, ൻ, ൺ, and ർ, where Indian language semi-consonants are shown in Malayalam; and period, also known as dot character, is assigned to Indian language character I, which is shown in Devanagiri;

specifying for each Indian language vowel, its full form and its corresponding vowel symbol;

identifying for each Indian language vowel symbol, part of the vowel symbol to be placed before or after a consonant;

identifying for each Indian language vowel symbol, part of the vowel symbol to be placed before and part to be placed after a consonant;

specifying for each Indian language consonant, its full form, its short form when appearing before another consonant, and its short form when appearing after another consonant;

identifying set of characters supported by an Indian language;

mapping several English character sequences to same character in an Indian language;

specifying English character sequences to identify special characters in an Indian language; and specifying Indian language character formation on a per font basis;

the said character mapping rules include:

when choosing between the said Indian language vowels and vowel symbols, selecting Indian language vowels when they are not preceded by one of the said consonants;

when choosing between the said Indian language vowels and vowel symbols, selecting Indian language vowel symbols when they are preceded by one of the said consonants;

when placing Indian language vowel symbols with a consonant, placing them before, after, or before and after the consonant they are joined with according to the said character mapping table;

selecting the said full form of Indian language consonants when they are not combined with another consonant;

selecting the said short form of Indian language consonants when they are combined with another consonant according to the said character mapping table;

placing the said short form of Indian language consonants before or after the consonants they are joined with according to the said character mapping table;

selecting the said full form of the consonant for output when no short form of Indian language consonant is given in the said character mapping table;

placing Indian language character ..്, which is shown in Malayalam, following first consonant, indicated by two dots, when two consonants appear next to each other in the said output;

when converting input character X, selecting Indian language character ..്, which is shown in Malayalam, if it is immediately preceded by one of the said Indian language consonants;

when converting input character X, selecting Indian language character ॰, which is shown in Devanagiri, if it appears at end of a word and is not immediately preceded by one of the said Indian language consonants;

when converting input character X, selecting Indian language character ऽ, which is shown in Devanagiri, if character A follows input character X;

when choosing between multiple characters in Indian language, selecting Indian language character that matches longest input string;

not converting input character sequences, which are not specified in the said character mapping table;

converting input character X to no character if character X is not mapped according to the said character mapping table and other character mapping rules;

converting Indian language character മ, which is shown in Malayalam, to Indian language character ..ം, which is shown in Malayalam, where two dots indicate position of accompanying consonant, if corresponding input character is not followed by English character, A, E, I, O, or U, and Indian language character അം, which is shown in Malayalam, is supported by chosen output language;

not converting Indian language character മ, which is shown in Malayalam, to Indian character ..ം, which is shown in Malayalam, where two dots indicate position of accompanying consonant, if following character in input string is M, P, Y, R, or V;

converting Indian language characters, ല, ള, ന, ണ, and ര, which are shown in Malayalam, respectively to ൽ, ൾ, ൻ, ൺ, and ർ, which are shown in Malayalam, when they appear at end of a string;

outputting Indian language character ..്which is shown in Malayalam, when final character in output string is one of the said Indian language consonants;

not outputting Indian language character ..്@which is shown in Malayalam, following one of the said semi-consonants;

optionally replacing special symbol ..്which is shown in Malayalam, appearing at end of a word by no vowel symbol when outputting into Indian language characters;

optionally converting the said input to a specific Indian language output; and optionally converting the said input to a specific Indian language font output;

the said computer program accepting input English characters as upper case characters, lower case characters, or a mixture of both upper case and lower case characters and treating them without regard to their upper case or lower case status when converting them into Indian language characters; and a microprocessor coupled to said input device, output device, and computer program, converting inputted at least one English character into corresponding output at least one Indian language character in accordance with the said character mapping table lookup and character mapping rules.

2. The system of claim 1, coupled with a storage medium, where inputted English characters are stored and all or a select portion of stored characters are presented to a transliteration system or another computer program as input.

3. The system of claim 1, where conversion of inputted English characters to one or more Indian language character sets is used for simultaneous or sequential displays in bill boards, lighted displays, hand-held devices, Personal Digital Assistants, cell phones, display phones, and caller identification devices.

4. The system of claim 1, where inputted English characters are encrypted and stored until they are ready to be converted to Indian language characters, when encrypted text is decrypted before inputting to a transliteration system or another computer program.

5. The system of claim 1, where conversion of the inputted English characters to Indian language characters is used in electronic communication, including electronic mail and messaging services known as Instant Messaging, Short Message Service, Enhanced Message Service, and Multimedia Message Service.

6. The system of claim 1, coupled with a storage device, inputted English characters are stored in place of Indian language characters.

7. A transliteration system comprising:

an input device inputting at least one Indian language character;

an output device outputting at least one English character;

a computer program converting at least one Indian language character into corresponding at least one English character based on a character mapping table and a set of character mapping rules;

the said character mapping table:

specifying a superset of Indian language characters, where:

Indian language vowels, അ, എ, ഇ, ഒ, ഉ, ആ, ഏ, ഈ, ഓ, ഊ, ഐ, ഔ, ഋ, ॠ, ऌ, ॡ, अं, अँ, അം, and അഃ, where Indian language vowels are shown in Malayalam except for RWU, LW, LWU, AMX, and ANX, which are shown in Devanagiri, are assigned respectively to English characters A, E, I, O, U, AA, EE, II, OO, UU, AI, AU, RW, RWU, LW, LWU, AMX, ANX, AM, and AHX;

Indian language consonants, ക, ഖ, ഗ, ഘ, ങ, ച, ഛ, ജ, ഝ, ഞ, ട, ഠ, ഡ, ഢ, ണ, ത, ഥ, ദ, ധ, ന, പ, ഫ, ബ, ഭ, മ, യ, ര, റ, ല, ള, ഴ, വ, സ, ഷ, ശ, ഹ, क़, ख़, ग़, ज़, ड़, ढ़, ண, फ़, य़, ട്ട and ന്റ, where Indian language consonants are shown in Malayalam except for KQ, GW, DW, DTW, PF, and YW, which are shown in Devanagiri and NN, which is shown in Tamil, are assigned respectively to English characters K, KH, G, GH, NG, C, CH, J, JH, NJ, T, TD, D, DT, NH, TH, TJ, DJ, DH, N, P, F, B, BH, M, Y, R, RH, L, LH, ZH, V, S, SH, Z, H, Q, KQ, GW, JW, DW, DTW, NN, PF, YW, TT, and NT;

Indian language vowel symbols, none, ..ാ, ..ി, ..ീ, ..ു, ..ൂ, െ.., േ.., ൈ.., െ..ാ, േ..ാ, ..ൌ, ..ൃ, ॄ, ॢ, ॣ, ं, ँ, ..ം, and ..ഃ, where Indian language vowel symbols are shown in Malayalam except for RWU, LW, LWU, AMX, and ANX, which are shown in Devanagiri, are also assigned respectively to English characters, A, E, I, O, U, AA, EE, II, OO, UU, AI, AU, RW, RWU, LW, LWU, AMX, ANX, AM, and AHX;

Indian language semi-consonants, ൽ, ൾ, ൻ, ൺ, and ർ, where all Indian language semi-consonants are shown in Malayalam, are also assigned respectively to English characters, L, LH, N, NH, and R;

Indian language special symbols, .., ऽ, and °, which are shown in Devanagiri, are assigned respectively to English characters, X, XA, and X; and Indian language symbol I, which is shown in Devanagiri, is assigned to dot character;

when converting short form of a consonant appearing in front of another consonant, if it is to be placed following the other consonant in output;

when converting short form of a consonant appearing following another consonant, if it is to be placed in front of the other consonant in output;

identifying set of characters supported by an Indian language;

identifying Indian language character representation in a font; and specifying English character sequences assigned to special characters in an Indian language;

the said character mapping rules include:

when mapping vowel symbols to English characters, placing them following consonant they are joined with;

converting semi-consonants, ൽ, ൾ, ൻ, ൺ, and ർ, where all Indian language semi-consonants are shown in Malayalam, appearing in middle of an input string respectively to English characters, LX, LHX, NX, NHX, and RX;

converting Indian language character ..്, which is shown in Malayalam, where two dots indicate position of an accompanying consonant, to no character if it is followed by another consonant;

when matching Indian language characters and their corresponding English character sequences, choosing longest English character sequence for output;

converting characters not specified in the said character mapping table or the said character mapping rules to no character in the said output;

optionally not converting no vowel symbol, indicated by the absence of any symbol along with a consonant, when it appears at end of a word;

optionally accepting the said input in a specific Indian language; and optionally accepting the said input in a specific Indian language font; and a microprocessor coupled to the said input device, output device, and computer program, converting inputted at least one Indian language character into corresponding output at least one English character in accordance with the said character mapping table lookup and character mapping rules.

8. The system of claim 7, where Indian language characters are converted to their corresponding English characters and converted again using a different font, providing a font substitution mechanism for Indian languages.

9. The system of claim 7, where Indian language characters are converted to their corresponding English characters for sorting Indian language text.

10. The system of claim 7, where Indian language characters are converted to their corresponding English characters before applying search algorithms on text.

11. The system claim 7, coupled with a storage device, Indian language characters are first converted to their corresponding English characters and stored as English characters.

* * * * *